June 14, 1927. 1,632,165
C. N. BERGMANN ET AL
MEASURING DEVICE FOR PLASTIC MATERIAL
Original Filed July 1. 1925 4 Sheets-Sheet 1
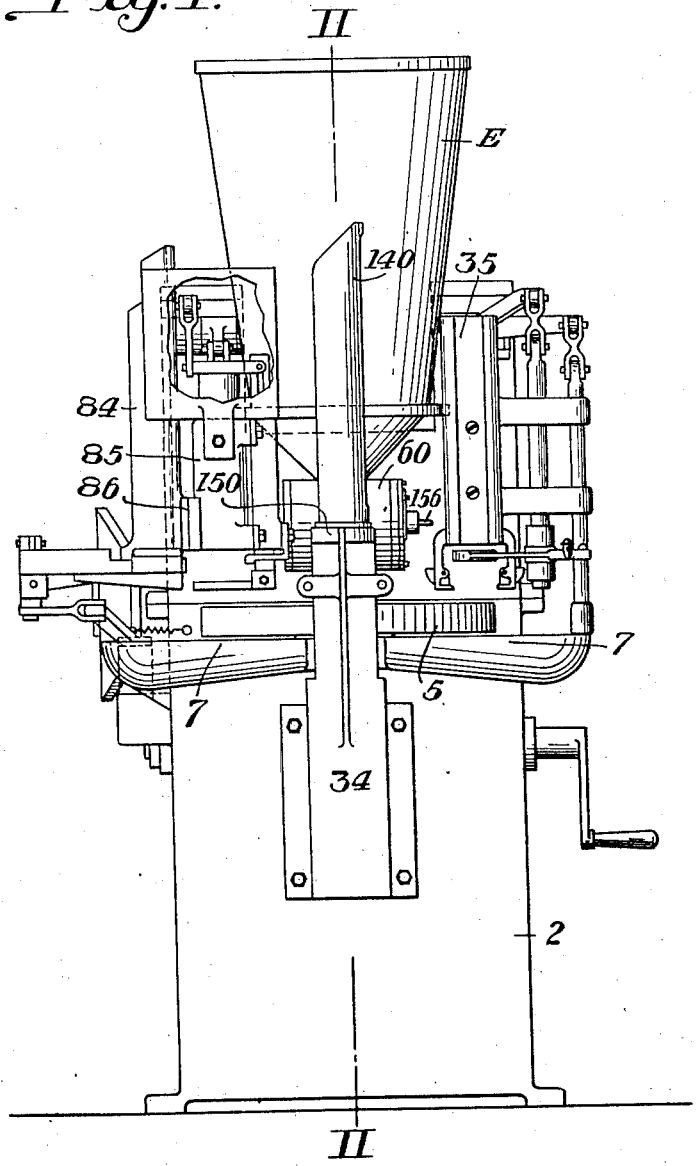

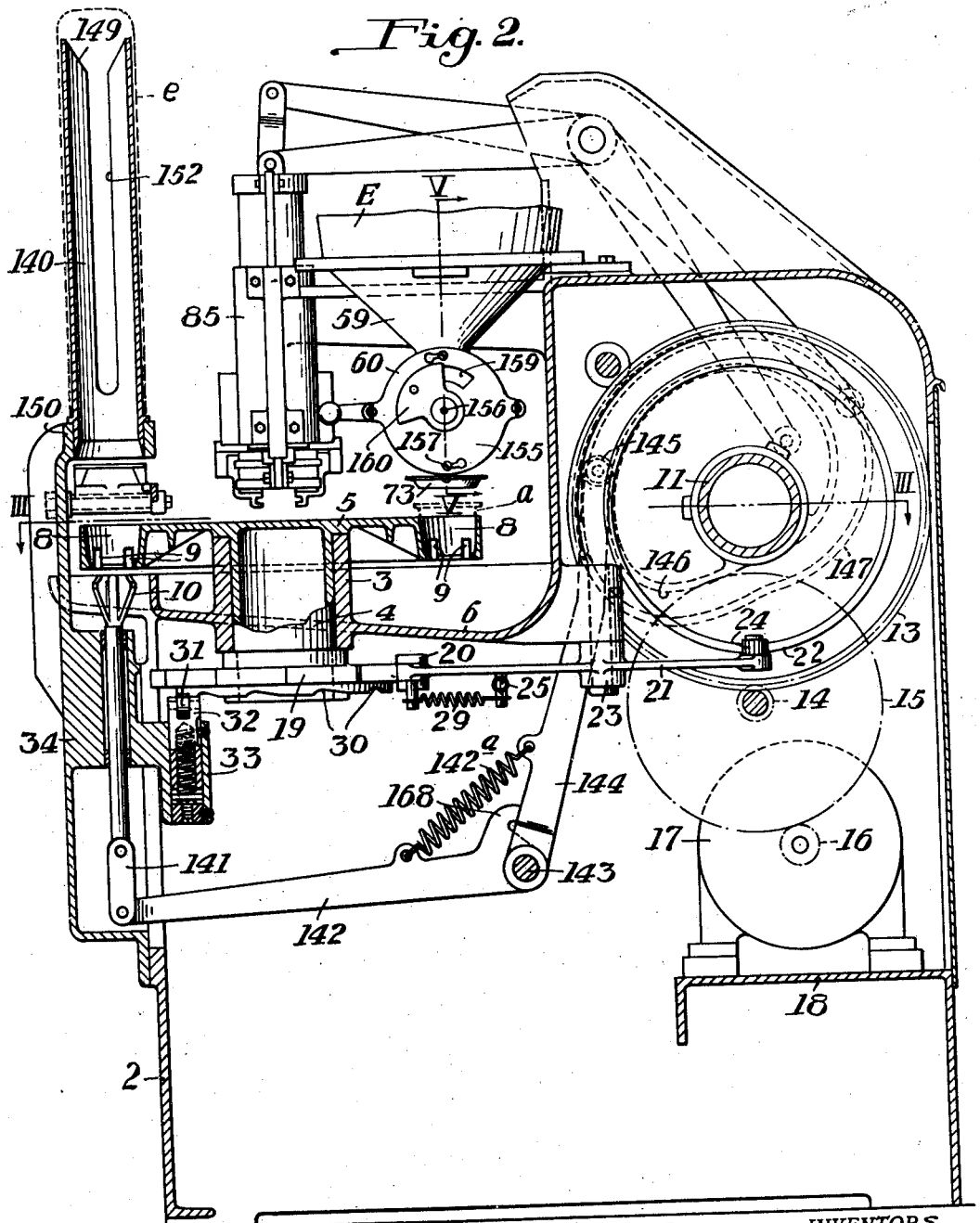

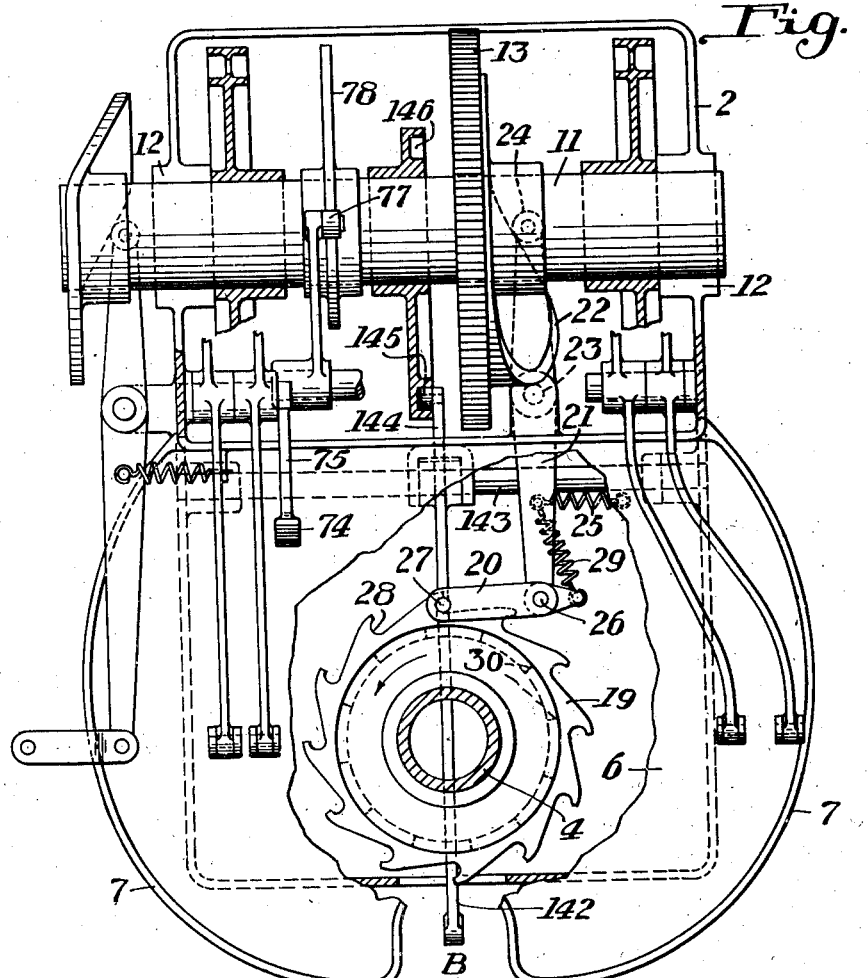
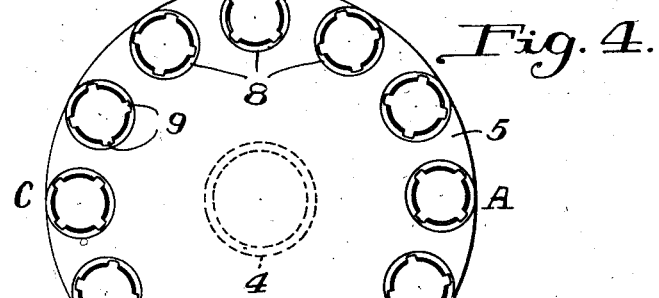

June 14, 1927.  1,632,165
C. N. BERGMANN ET AL
MEASURING DEVICE FOR PLASTIC MATERIAL
Original Filed July 1, 1925  4 Sheets-Sheet 4
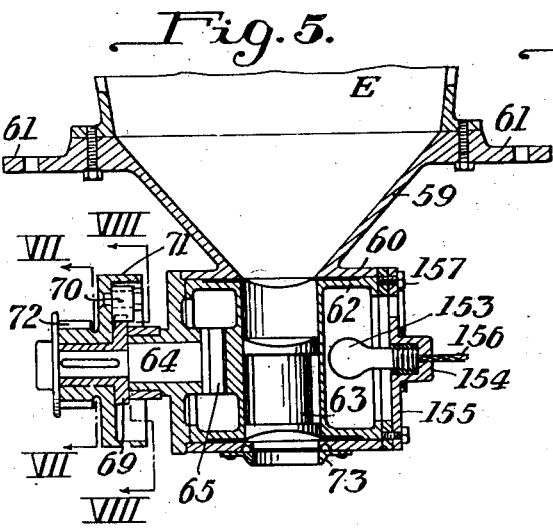
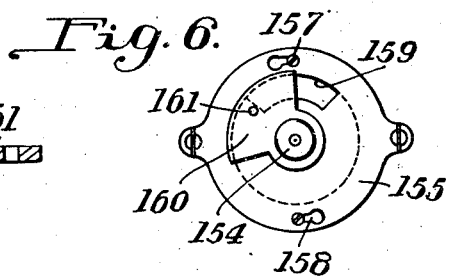
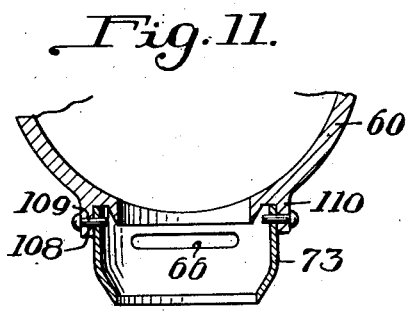
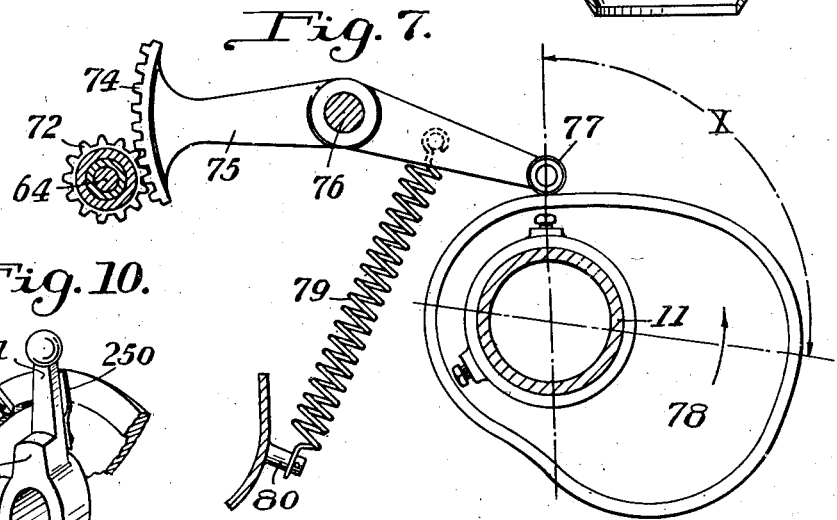
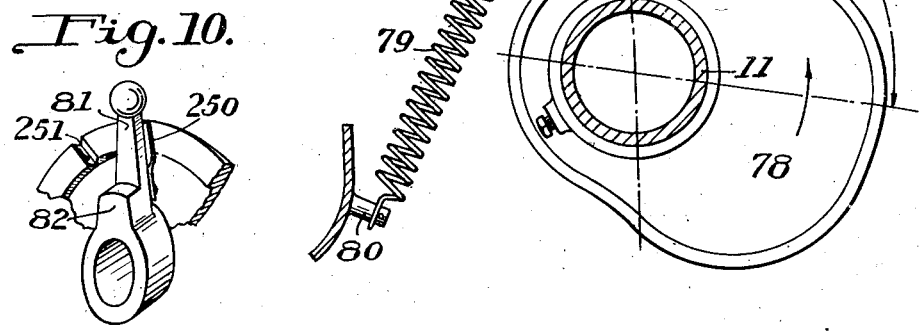
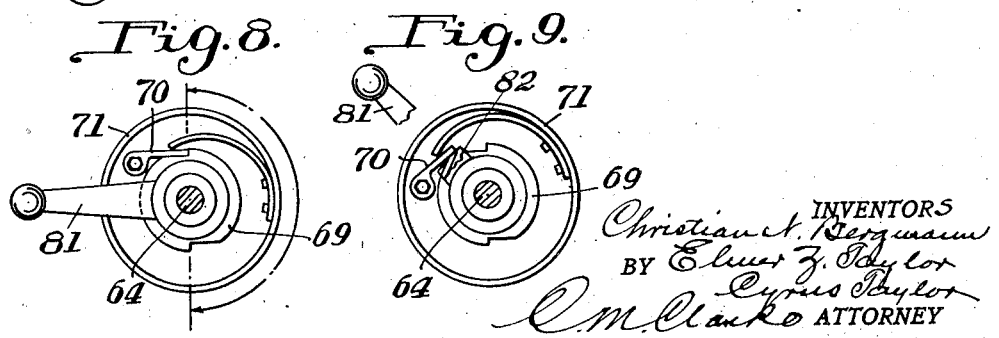

Patented June 14, 1927.

1,632,165

UNITED STATES PATENT OFFICE.

CHRISTIAN N. BERGMANN, OF PITTSBURGH, PENNSYLVANIA; ELMER Z. TAYLOR, OF NEWARK, NEW JERSEY; AND CYRUS TAYLOR, OF HARTFORD, CONNECTICUT, ASSIGNORS TO BERGMANN PACKAGING MACHINE COMPANY, OF PITTSBURGH, PENNSYLVANIA, A CORPORATION OF DELAWARE.

MEASURING DEVICE FOR PLASTIC MATERIAL.

Original application filed July 1, 1925, Serial No. 40,796. Divided and this application filed May 26, 1926. Serial No. 111,772.

Our invention is an improvement in machines for measuring units of mobile material, as ice cream, for separating such measured units from a mass, depositing them separately into containers, capping the containers, and ejecting the filled containers. The invention also embodies an improved mechanism for placing the containers in a carrier whereby they are brought separately into position for filling, capping and ejection.

The present invention is generally similar in its main elements to that shown in a prior application by C. N. Bergmann et al on April 4, 1925, Serial No. 20,696, but differs therefrom mainly in the substitution of an intermittently rotatable carrying turret for the receptacles, in place of the longitudinally movable carrying trays thereof, as well as in other respects hereinafter described.

This application is a division of our prior application filed July 1, 1925, Serial No. 40,796 for unit measuring machines, and refers particularly to the measuring device for the plastic units.

In the present construction we provide a rotatable turret wheel having an annular series of cup receiving cavities by which each cavity is brought successively in registering position underneath the cup depositor, the filling mechanism and the capper, and then over the ejector. Also an improved cup depositor and cover placing mechanism with a suction controlled plunger, means for actuating the several operative mechanisms in sequence with suitable rest periods, and various features of detail construction, as shall be hereinafter more fully described.

In the drawings illustrating one preferred embodiment of the invention:

Figure 1 is a view of the machine in front elevation;

Figure 2 is a partial central vertical section on the line II—II of Fig. 1;

Figure 3 is a horizontal sectional view on the line III—III of Fig. 2, with the turret removed and partly broken away;

Figure 4 is a plan view of the turret;

Figure 5 is a detail vertical section on the line V—V of Fig. 2, showing the cream filler;

Figure 6 is an end view of the cream filler, showing the adjustable air control damper;

Figure 7 is a transverse section on the line VII—VII of Fig. 5 showing the ratchet rotating mechanism for the cream filler drum;

Figure 8 is a sectional detail view on the line VIII—VIII of Fig. 5 showing the cam-actuated mechanism for rotating the drum of the cream filler, in normal operative position;

Figure 9 is a similar view, showing the pawl retracted by the throw out lever;

Figure 10 is a detail view showing the inner side of the throw out lever for the pawl of the drum ratchet;

Figure 11 is a detail view of the guiding shell for the filler.

Referring to the drawings, the operative portions of the machine are mounted upon and within a hollow box shaped base 2 of cast metal supported upon the floor or foundation by a suitable flat pedestal, as in Fig. 1.

At the front middle portion of the base is a vertically arranged bearing 3 in which is rotatably mounted the central depending stem 4 of the turret 5. Bearing 3 is cast integral with a laterally extending transverse bottom wall 6, forming a concave dish or basin, surrounding the turret beyond the lower base and providing a rearwardly inclined collecting and drainage cavity for excess cream, washing, etc.

As shown in Fig. 3 the outer edges 7 are rounded, and surround the turret, a drain connection being made at the lower level for cleaning purposes. Turret 5 is generally of the form of a flat wheel or disk having an annular series of tapered sockets 8 open at the bottom and provided with lateral clearance openings 9 for the discharging plunger 10. Sockets 8 are of a size to receive and support on their flanged bottoms the cups or receptacles *a* as they are deposited therein for filling.

It will be understood that sockets 8 are in multiples of four, as twelve, so as to always locate a socket at four equidistant points around the center in position for cup depositing, filling, capping and discharge at each intermittent rest period of the turret.

The several mechanisms for such purpose receive their operative movement from a main transverse shaft 11 mounted in bearings 12—12 of the main frame 2. Shaft 11 is driven through gearings 13—14—15—16 or other suitable gearing, from a motor 17. Said motor is mounted on an interior supporting shelf or base 18 of the frame and is provided with the necessary current supply, controls, etc.

Turret 5 is intermittently rotated, say one twelfth of a revolution with an intervening rest period, by a ratchet wheel 19 and pawl 20 of lever arm 21 by cam 22 extending from or movable with gear 13. Lever 21 is pivoted at 23 and its terminal roller 24 is held against the annular face of cam 22 by a spring 25.

Pawl 20 is pivoted at 26 to the other end of lever 21 and its free end has a terminal pin or roller 27 adapted to engage the successive teeth sockets 28 of the ratchet wheel 19 for each operation, under control of spring 29 secured to the other end of the pawl and to the lever, as shown.

The under side of ratchet wheel 19 is provided with a series of holding sockets 30 adapted to co-act with roller 31 of a spring retracted stud 32 mounted in a supporting housing 33 of the discharge plunger housing 34. In its intermittent rotation, one complete revolution of the turret will bring each of the annular cavities 8 into rest positions A, B, C and D, respectively. In such positions, a cup is placed in the cavity at A, the cup is filled at B, the cover or cap is placed in the cup at C, and the filled cup is discharged upwardly at D.

The cups $a$ are deposited at position A one at a time from the bottom of magazine tube 35 into sockets 8 of turret wheel 5 by the means shown and described in the prior application referred to Serial No. 40,796 and co-pending application Serial No. 41,105.

When the cup is moved around to position B it is filled with ice cream, or other commodity, by means utilizing a suction producing gravitating plunger for extracting a unit from the charge of plastic material, as ice cream.

Depending below a hopper bottom 59 of hopper E is a short cylindrical casing 60, supported from the upper frame of the machine by flanges 61 bolted thereto.

Within casing 60 is a rotatable drum or barrel 62 having a middle transverse passageway adapted to register with the bottom opening of the hopper and an opposite discharge opening in the casing, as in Fig. 5.

A reciprocable plunger 63 acts to withdraw and eject a measured unit of ice cream into the cup at each half revolution of the barrel 62. The casing 60 is closed at one end providing a central bearing for a rotating spindle 64, removably connected in driving engagement with the inner end of the drum at 65, allowing for its withdrawal from the other end.

Keyed to the outer end of spindle 64 is a ratchet wheel 69 having two oppositely located teeth for engagement by the spring pressed pawl 70 of a shrouded wheel 71. Said wheel is freely journalled around the hub of the ratchet 69 and has a pinion gear 72 formed thereon.

Pinion 72 is actuated for one half revolution by a segment gear 74 at the outer end of lever 75 pivoted on stud 76 and having a roller terminal 77 at its inner end, bearing against the face of cam 78 on main shaft 11.

A spring 79 secured to the lever and to an abutment 80 of the frame, holds the lever firmly but resiliently against the face of cam 78.

Each revolution of the cam produces at the proper time a half rotation of the barrel 62 with discharge of a measured unit, so long as pawl 70 is in operative position.

Cam 78 is so proportioned that it will rotate the drum the desired one half revolution, such active portion of the cam being indicated by the line X Fig. 7. The remaining portion of the cam rotation is during reversal of pinion 72 and stationary condition thereof, providing an ample rest period for functioning of the filler.

For the purpose of preventing dripping or slopping of the cream, and for positively centering the drop of the formed unit into the cup $a$, a downwardly extending tubular shell or trough shaped wall 73 is secured to the under side of the casing 60, concentric with the plunger cavity.

The general views show a shallow form of such shell, and a longer form is shown in detail in Fig. 11. Said shell is preferably larger at the top than the diameter of the plunger cavity and tapers towards the bottom where it is approximately the same size as the unit, but may be of any suitable shape adapted to guide the unit into the cup.

The shell 73 as shown is held in any suitable manner, as by bayonet joint slots 108 engaging pins or studs 109 on the inner sides of a flange 110 of casing 60.

The shell may thus be easily removed for cleaning of any of the parts, and easily and quickly replaced.

One or more air circulation openings 66 are provided, or the upper edge may be left partly open, so as to facilitate free falling of the unit therethrough without retardation arising from a partial vacuum condition.

When it is desired to put the filling mechanism out of commission at any time, a throw out lever 81 is thrown to the position of Fig. 9. Said lever is journalled by its hub around the tubular bearing of the casing, and has a lug 82 which rides under the extended edge of pawl 70, so as to hold it outwardly from engagement with the ratchet tooth.

In such position a half rotation of the shrouded wheel will impart no movement to the drum until the throw out lever is thrown back to the position of Fig. 8, allowing the pawl to function.

By such means, the filler may be put out of service and the machine operated as to its other functions by merely throwing the lever 81 to disengaging position, Fig. 9, where it may be held by a suitable catch.

Under certain conditions it is desirable to heat the unit forming mechanism, and to regulate the heat from time to time, dependent on the temperature of the ice cream being used in the machine.

For such purpose we utilize any suitable heating device, as a resistance element or lamp 153 located in the hollow end of rotatable barrel 62. The lamp is mounted by its socket in the central hub 154 of a closing end plate 155 and receives current by wires 156 extending through the center thereof.

Plate 155 is secured by screws 157 extending through annular slots 158 having terminal holes, permitting application or removal of the plate by a short turning movement.

For the purpose of providing ventilation, plate 155 is provided with a segmental opening 159. A regulating damper plate 160 is journalled around the hub 154 provided with a button 161 by which it may be accurately set to the desired degree, as in Figs. 5 and 6.

The filled cups are capped at position C by placing within the upper edge of each cup a thin paper disk having a projecting withdrawal tang. The disks are mounted in a vertically arranged bank in a magazine tube 84, slotted along its outer side, and fixedly bolted to a plunger frame 85 at 86. The disks are placed in the top of each filled cup, which is then carried around to the discharging position, as described in the parent application.

When the filled and capped cup arrives at position D it is ejected upwardly into a receiving cylinder 140 by plunger 10. Said plunger has a series of laterally diverging wings adapted to pass through openings 9 of socket 8 to engage the bottom of the filled cup by its annular edge, avoiding any danger of injuring the middle bottom portion.

The stem of the plunger is guided in bearing 34 and is connected by link 141 with the end of lever 142 pivoted to a cross shaft 143. A cam lever 144 is also pivoted on shaft 143 and extends upwardly by a terminal having a roller 145 engaging the cam groove 146 of cam 147 on shaft 11.

As the cam rotates, the groove is so designed as to throw the plunger 10 upwardly at the proper time to discharge the filled and capped cup upwardly towards the tube 140.

Ordinarily, levers 142 and 144 will operate together as one piece, but are made separate to allow for easement of the lifting pressure on the cup in case of jamming.

For such purpose lever 142 bears up against lever 144 by an extended lug 168 due to the holding action of spring 142$^a$ connecting the levers across the angle joint, as in Fig. 2.

Normally the cam will impart lifting and lowering movement to the plunger, but if the plunger is arrested for any reason, the hinge joint will open, allowing the cam movement of section 144 to continue without actuating the plunger, until the obstruction is removed.

Tube 140 is slotted along opposite sides for inserting the fingers in removing any selected number of cups, and is preferably inclined at the top as at 149. The base of the tube is flared for easy entrance, and is secured in an upper extension 150 of housing 34 as in Fig. 2.

In assembling the filled cups for refrigeration, storage, etc., a paper bag $e$ is placed over the tube 140 in inverted position, the tapered top facilitating such placement, and as many cups as are desired, say four or eight, are gathered upwardly into the bag by lifting the cups, through the opposite open and closed slots 152. Thus the cups and the enclosing bag are removed together as they accumulate by finally lifting through the open slot, the bags being closed at the lower open end in any suitable way.

It will be understood that each of the sockets 8 of the turret is occupied successively by a cup at position A, and that as each arrives at the subsequent positions B, C and D, the operations above described are performed. Therefore as each socket arrives at the final discharging position, a filled cup is ejected, the empty socket then passing around to position A where a fresh empty cup is deposited.

The operation is continuous, rapid, and substantially automatic, merely requiring renewal of the cup and cap supply in their respective magazine tubes, removal of the filled cups into their paper bags, and of course maintaining a sufficient amount of ice cream at all times in the hopper.

The several movements are all effected through the various cams and their transmitting levers in the manner described and illustrated.

The timing of the operations is easily controlled by the design and setting of the cams and the various adjusting, limiting and controlling devices and mechanisms. The machine as a whole is very compact and of comparatively small size, considering its capacity and speed of operation.

It may be changed or varied by the skilled mechanic in various details or features, or otherwise modified within the general principle of operation, but all such changes are to be understood as within the scope of the following claims.

We claim:—

1. In a unit measuring machine, the combination with a casing and communicating reservoir, of a rotatable drum having a measuring cavity, a rotating stem therefor having a ratchet wheel, a driven wheel having a co-acting pawl, and a throw out lever journalled on the stem having an abutment portion for engagement with the pawl.

2. In a unit measuring machine, the combination with a casing having an inlet opening and an outlet opening and a reservoir communicating through the inlet opening, of a rotatable drum having an open air-circulating interior and a transverse shell extending across the interior providing a measuring cavity adapted to register with the inlet and outlet openings, and a heat radiating device mounted in one end of the casing adjacent its air circulating interior.

3. In a unit measuring machine, the combination with a casing having an inlet opening and an outlet opening and a reservoir communicating through the inlet opening, of a rotatable drum having an open air-circulating interior and a transverse shell extending across the interior providing a measuring cavity adapted to register with the inlet and outlet openings, a heat radiating device mounted in one end of the casing adjacent its air circulating interior, and means providing for controlled air circulation between the exterior and interior of the drum.

4. In a unit measuring machine, the combination with a casing and communicating reservoir, of a rotatable drum having a measuring cavity, a heating device mounted in one end of the casing and extending into the drum, an apertured closing wall for the drum, and an adjustable damper plate thereon for varying the air circulation therethrough.

5. In a unit measuring machine provided with a casing having an upper inlet opening and a lower outlet opening, a reservoir communicating with the inlet opening, and a rotatable drum within the casing having a transverse plunger opening adapted to register with the inlet and outlet opening respectively; the combination with the casing of a supplemental guiding shell secured to the casing and depending downwardly below the outlet opening thereof.

6. In a unit measuring machine provided with a casing having an upper inlet opening and a lower outlet opening, a reservoir communicating with the inlet opening, and a rotatable drum within the casing having a transverse plunger opening adapted to register with the inlet and outlet opening respectively; the combination with the casing of a supplemental guiding shell secured to the casing and depending downwardly below the outlet opening thereof having an upper portion enlarged laterally beyond the outlet opening and a lower portion tapering inwardly to a size corresponding to that of the outlet opening.

7. In a unit measuring machine provided with a casing having an upper inlet opening and a lower outlet opening, a reservoir communicating with the inlet opening, and a rotatable drum within the casing having a transverse plunger opening adapted to register with the inlet and outlet opening respectively; the combination with the casing, of a supplemental guiding shell secured to the casing and depending downwardly below the outlet opening thereof having an upper portion enlarged laterally beyond the outlet opening and a lower portion tapering inwardly to a size corresponding to that of the outlet opening and provided with an air circulation port through its enlarged upper portion.

8. In a unit measuring machine provided with a casing having an upper inlet opening and a lower outlet opening, a reservoir communicating with the inlet opening, and a rotatable drum within the casing having a transverse plunger opening adapted to register with the inlet and outlet opening respectively; the combination with the casing, of a supplemental guiding shell secured to the casing and depending downwardly below the outlet opening thereof having an upper portion enlarged laterally beyond the outlet opening and a lower portion tapering inwardly to a size corresponding to that of the outlet opening, said shell having removable connection with the casing.

In testimony whereof we have hereunto set our names.

CHRISTIAN N. BERGMANN.
ELMER Z. TAYLOR.
CYRUS TAYLOR.